United States Patent
Ogami

(10) Patent No.: US 7,042,931 B2
(45) Date of Patent: May 9, 2006

(54) PATH DETECTION METHOD AND RECEIVER

(75) Inventor: Tadashi Ogami, Tokyo (JP)

(73) Assignee: NEC Corporation, Tokyo (JP)

( * ) Notice: Subject to any disclaimer, the term of this patent is extended or adjusted under 35 U.S.C. 154(b) by 780 days.

(21) Appl. No.: 09/858,719

(22) Filed: May 17, 2001

(65) Prior Publication Data

US 2001/0043643 A1    Nov. 22, 2001

(30) Foreign Application Priority Data

May 18, 2000    (JP) .......................... P2000-146750

(51) Int. Cl.
*H04B 1/707*    (2006.01)
(52) U.S. Cl. ........................ 375/150; 375/142; 375/343
(58) Field of Classification Search ................ 375/141, 375/142, 143, 147, 150, 152, 343
See application file for complete search history.

(56) References Cited

U.S. PATENT DOCUMENTS

| | | | | |
|---|---|---|---|---|
| 6,704,347 B1 * | 3/2004 | Miura | ........................ | 375/150 |
| 2003/0012270 A1 * | 1/2003 | Zhou et al. | ................. | 375/150 |

FOREIGN PATENT DOCUMENTS

| | | |
|---|---|---|
| JP | 10-32523 A | 2/1998 |
| JP | 10-257021 A | 9/1998 |
| JP | 10-271034 A | 10/1998 |
| JP | 11-251960 | 9/1999 |
| JP | 11-251962 | 9/1999 |
| JP | 11-252044 | 9/1999 |
| JP | 2000-22665 A | 1/2000 |
| JP | 2000-49659 | 2/2000 |
| JP | 2000-49751 | 2/2000 |
| JP | 2000-49881 A | 2/2000 |

* cited by examiner

*Primary Examiner*—Jay K. Patel
*Assistant Examiner*—David B. Lugo
(74) *Attorney, Agent, or Firm*—Sughrue Mion, PLLC

(57) ABSTRACT

A path detection method comprises; a correlator which receives input of a baseband signal converted to a digital signal in a wireless receiver, and which takes a reverse spread produced by the multiplication of the baseband signal and a spread code pilot symbol and outputs a correlation signal; an in-phase adder which, in each time slot, adds the correlation signal for the time slot a predetermined number of times, a first addition results storage memory for adding for the predetermined number of times, a second addition results storage memory for storing the addition results from the aforementioned in-phase adder when the addition is completed the predetermined number of times in the aforementioned time slot, an electric power adder for batch reading the results for each time slot from the aforementioned second addition results storage memory and performing addition, and a path detection apparatus which executes a path detection according to the output of the aforementioned electric power adder.

33 Claims, 13 Drawing Sheets

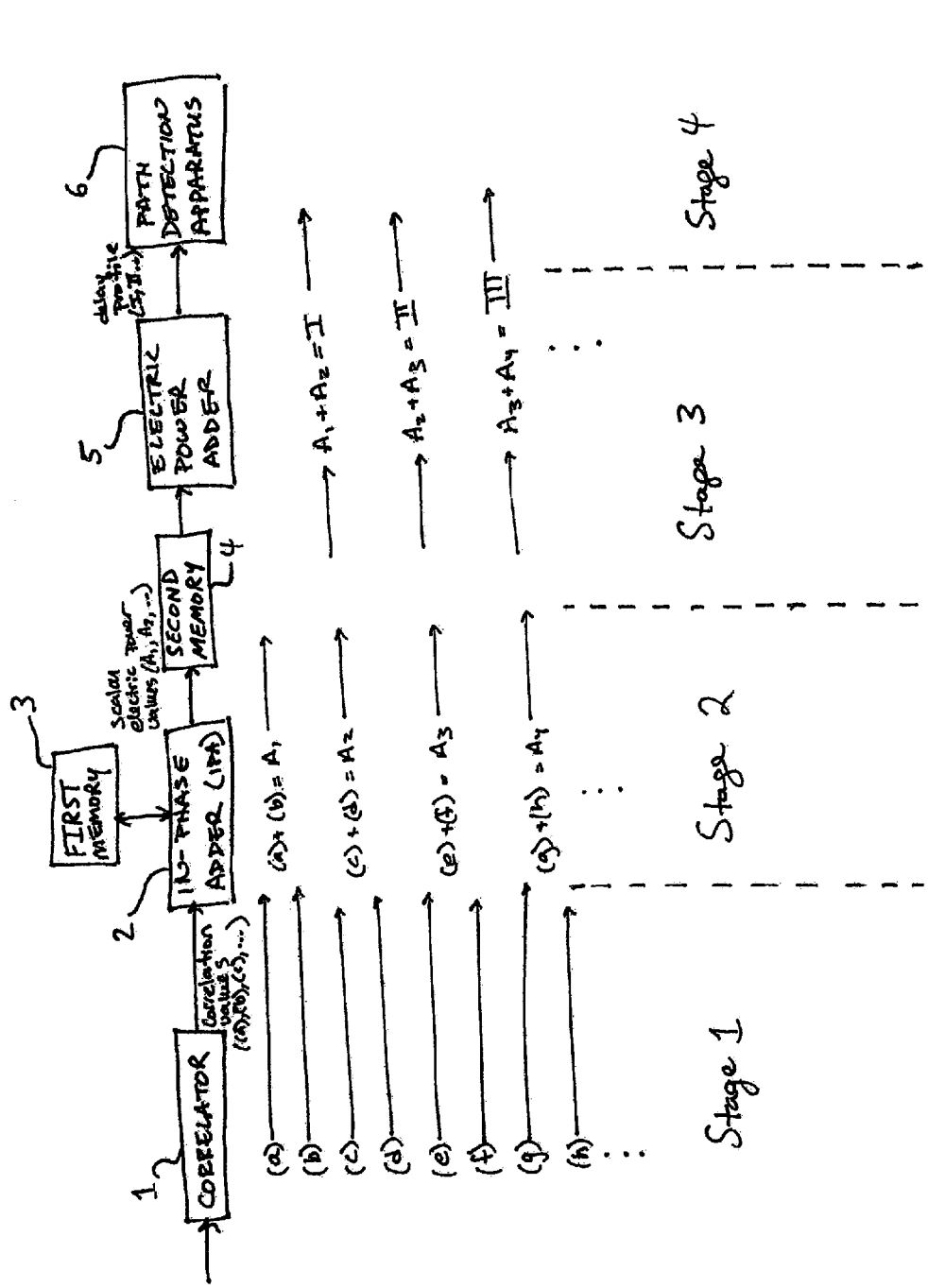

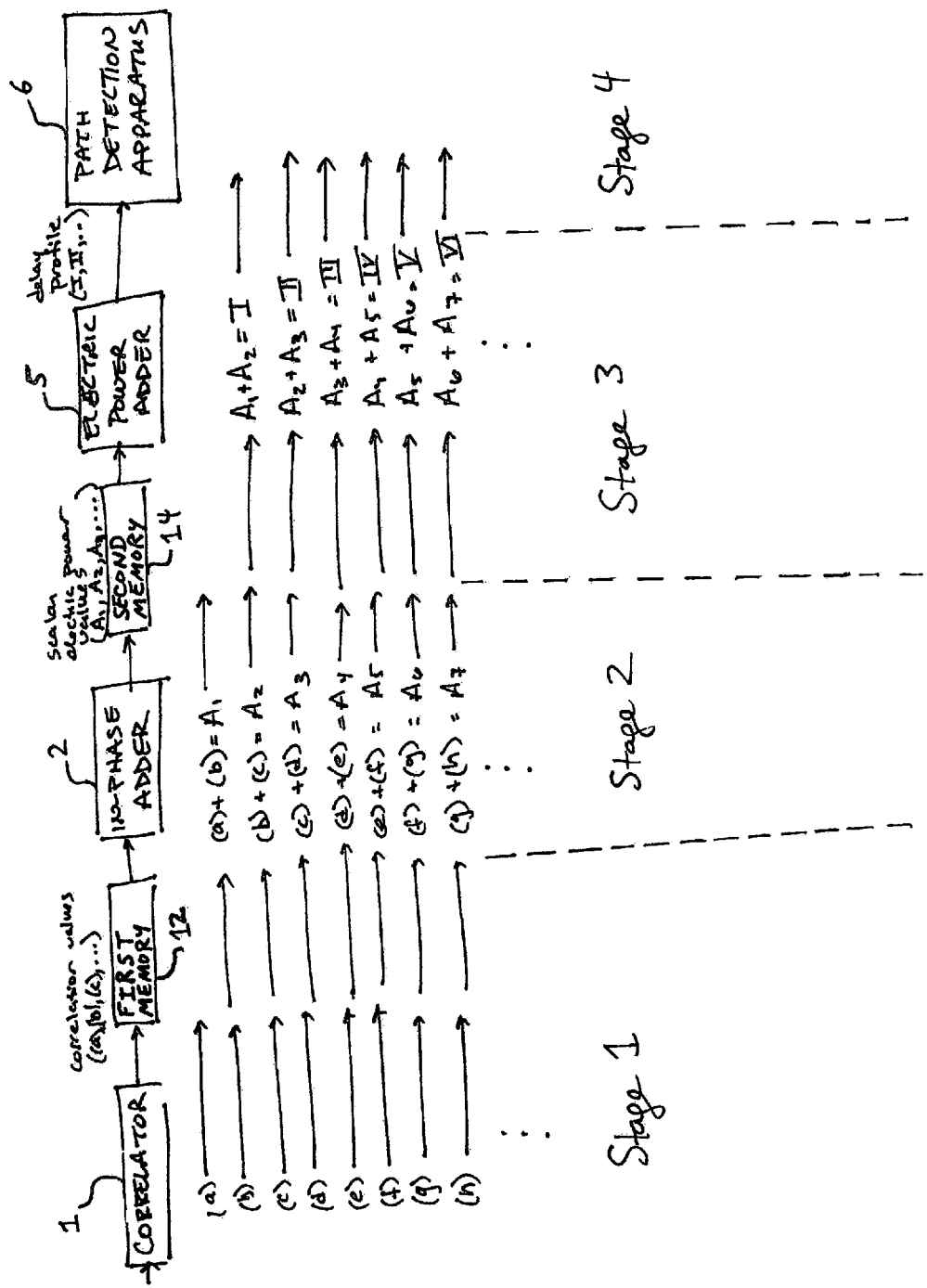

PATH DETECTION METHOD AND RECEIVER

BACKGROUND OF THE INVENTION

1. Field of the Invention

The present invention relates to a path detection method and a receiving device thereof used in a direct spread spectrum communication method receiver using DS-CDMA: Direct Sequence-Code Division Multiple Access.

2. Description of the Related Art

A conventional example of a receiving method which enables random access by packet data in a mobile communication system using a direct spread spectrum communication method is disclosed in Japanese Unexamined Patent Application, First Publication No. 11-252044, wherein the reception of burst signals at a receiver of a base station of a mobile communication system is described, with a plurality of mobile devices simultaneously making access requests to the wireless base station using a common spread code. In the reception of burst signals, because when a plurality of mobile stations send the same spread code they interfere with one another, it is difficult to strictly control the transmitting power of the mobile device and the base station and therefore the dispersion of the level received by the wireless base station increases, the delay profile used to detect the path of each mobile station is disrupted, and the path detection ability is degraded. An object of the present invention is to resolve these problems.

FIG. 10 shows a structural block diagram of a receiving system of a wireless base station of the same Japanese Unexamined Patent Application, First Publication No. 11-252044. In a mobile station 200, short codes having orthogonal properties, such as Gold code or Walsh code, are sequentially and repeatedly assigned a pilot signal PL so as to make identification by a plurality of pattern symbols possible, and each mobile device 200 accesses a base station 300 with a burst signal which has undergone spectrum spreading with a spread code for burst signals, and which functions as a PL pattern. In the wireless base station 300, the signal is received by an antenna 310 and the received signal is converted from analogue to digital with an AD converter 320, and then undergoes reverse spread in the spread code decoder 400 to acquire the signal data. A plurality of spread code decoders 400 corresponding with the spread code of the burst signal are provided.

A burst signal decoder will be described using a spread code A as an example. Firstly, a spread code generator 410 for generating the spread code A, and a PL searcher 420, a PL-RAKE synthesizer 460 and a PL data decoder 470 corresponding with the type of PL pattern are provided. The PL searcher 420 inputs the burst signal which has been received from the mobile station and digitally converted and the spread code A, and using the spread code A and the code string of the PL pattern, determines the correlation components of the search range (PL profile) by PL component in-phase addition, and detects the multi-path of each PL pattern of the received burst signal.

The PL-RAKE synthesizer 460 RAKE synthesizes and outputs the correlation components for the multi-path of each PL pattern. The PL data decoder 470 has the functions of decoding the signals corresponding with each RAKE generated and output PL pattern, extracting the mobile station identifier incorporated in the decoded signal, assigning a mobile station identification number and outputting the data.

Furthermore, a plurality of tracking sections 440 which receive input of the spread code A output by the spread code generator 410 and the burst signal received from the mobile station which has undergone digital conversion, and perform a tracking process for the indicated path (the process whereby minute variations in the reception path timing, which occur due to variations in the propagation delay of the signal between the mobile station and the wireless base station as a result of variations in the position of the mobile station, are tracked); a correlator 450 which receives input of the same spread code A output by the spread code generator 410 and the burst signal received from the mobile station which has undergone digital conversion, and obtains the correlation components of the input signal in accordance with the output of the corresponding tracking section 440; and a path controller 430 for controlling the path are provided.

The PL searcher 420 receives input of the spread code A output by the spread code generator 410 and the burst signal received from the mobile station which has undergone digital conversion, calculates the correlation components throughout the search range in spread code A and determines the profile, and detects the path candidacy of the received burst signal. The path controller 430 receives input of the path information output by the PL searcher 420, determines which paths should be tracked and instructs the tracking section 440. Furthermore, in accordance with the path information instructed to the tracking section 440, the path controller 430 also issues instructions for connecting PL-RAKE synthesizers 460 corresponding with the same PL pattern.

Furthermore, the path detection method described in "From the Fundamentals to the Application of CDMA Technology" by Takuro Sato H9 12–26 Realize Co. Ltd, pp 51–53 will be explained as conventional technology, with reference to FIG. 8.

An example of the structure of a conventional path detection method is shown in FIGS. 8 and 11. This conventional path detection method comprises a correlator 1, an in-phase adder 20 and an addition result temporary storage memory 1 (numeral 21 in FIG. 8) attached thereto, an electric power adder 23 and an addition result temporary storage memory 2 (numeral 22 in FIG. 8) attached thereto, and a path detection apparatus 6.

A conventional path detection method having this type of construction operates in the following manner. FIG. 9 shows a flow chart describing the operation of this conventional example (see also, FIG. 11 illustrating the path detection method according to conventional technology).

Firstly, after the CDMA method frequency modulated signal is converted to a baseband signal in the high-frequency receiver, a correlation process is performed in the correlator 1 for the input data sequence (S21 in FIG. 9). Specifically, correlation calculations of the input data sequence and the system sequence where the pilot symbol is spread by the spread code which is assigned to each user, are conducted for the window width for which path detection is performed. Correlation calculation is performed for every time slot. Here, the correlation value output from the correlator 1 is a vector quantity.

Next, an in-phase addition process (see, e.g., stage 2 in FIG. 11) is performed by the in-phase adder 20 (step S22). Specifically, the correlation values of the input vector quantities undergo the addition process (e.g., (a)+(b) in FIG. 11) as a vector quantity. A judgement is made as to whether or not the correlation value has been added x number of times (step S23), and in the case where x iterative additions (e.g., x=2 in FIG. 11) have been completed, the in-phase counter for counting the number of iterations of in-phase addition is reset, in preparation for the next in-phase addition cycle (step S25) (see, e.g., (c)+(d), (e)+(f) in FIG. 11). In addition, the addition results are converted to a scalar quantity electric power value (see, e.g., $A_1, A_2, A_3, A_4$ in FIG. 11) and output to the electric power adder 23 (see, e.g., stage 2 in FIG. 11). In the case where the number of addition iterations has not reached x times, the addition results are stored (step S24) in the addition result temporary storage memory 1 (numeral 21 in FIG. 8; this addition result temporary storage memory may also be referred to as "memory 1"), and the process returns to step S21.

Next, an electric power addition process (see, e.g., stage 3 in FIG. 11) is performed by the electric power adder 23 (step S26). Specifically, the input electric power value undergoes y addition iterations (e.g., $(A_1+A_2)$ in FIG. 11), and a delay profile (e.g., I and II in FIG. 11) is prepared. Here, a judgement is made as to whether or not the electric power value has been added y number of times (step S27), and in the case where y addition iterations (e.g., y=2 in FIG. 11) have been completed, the electric power addition counter for counting the number of iterations of electric power addition is reset, in preparation for the next electric power addition cycle (step S29) (e.g., $(A_3+A_4)$ in FIG. 11). In the case where the number of addition iterations has not reached y times, the addition results are stored (step S28) in the addition result temporary storage memory 2 (numeral 22 in FIG. 8; this addition result temporary storage memory may also be referred to as "memory 2"), and the process returns to step S21.

Finally, the path to be assigned to each finger (RAKE synthesizer) is determined by the path detection apparatus 6, using the delay profile (e.g., I and II in FIG. 11) prepared by the electric power adder 23 (steps S30, S31) (see, e.g., stage 4 of FIG. 11). Specifically, by performing threshold value processing (step S30) for the input delay profile (e.g., I and II in FIG. 11), highly accurate paths are extracted and assigned to each finger (step S31). Subsequently, a judgement is made as to whether or not the data to be received has finished (step S32), and if the data is not finished the process returns to step S21. If the data has finished, the path detection process awaits the reception of the next data.

However with this conventional technology, because the timing with which the in-phase adder and the electric power adder perform output to the next step in the process is limited by the total number of correlation values to be added, the number of times the path detection process is executed cannot be increased without decreasing the total number of correlation values (see, e.g., FIG. 11 illustrating that the path detection process is executed twice according to delay profiles I, II for the first eight correlation values (a), (b), (c), (d), (e), (f), (g) and (h)). Accordingly, this conventional technology is restricted in that the time spent on the path detection process becomes fixed, and the path detection process time cannot be compacted or accelerated as much as is possible.

SUMMARY OF THE INVENTION

An object of the present invention is to improve the compliance with the propagation environment, by storing the addition results cyclically, and enabling the path detection process to be always executed using the addition results for the most recent adding cycle time slot.

In order to solve the aforementioned problem, a path detection method according to the present invention comprises a correlator which receives input of a baseband signal which has been converted to a digital signal by a demodulator and an A/D converter in a wireless receiver, and which takes a reverse spread produced by the multiplication of the baseband signal and a spread code pilot symbol and outputs a correlation signal, an in-phase adder which, in each time slot, adds the correlation signal for the time slot a predetermined number of times, a first addition results storage memory for performing the addition process the predetermined number of times, a second addition results storage memory for storing the addition results from the aforementioned in-phase adder when the addition has been completed the predetermined number of times in the aforementioned time slot, an electric power adder for batch reading the results for each time slot from the aforementioned second addition results storage memory and performing addition, and a path detection apparatus which executes a path detection according to the output of the aforementioned electric power adder.

Furthermore, a path detection method according to the present invention comprises a correlator which receives input of a baseband signal which has been converted to a digital signal by a demodulator and an A/D converter in a wireless receiver, and which takes a reverse spread produced by the multiplication of the baseband signal and a spread code pilot symbol and outputs a correlation signal, a first addition results storage memory for storing the aforementioned correlation signal to enable the addition process to be performed a predetermined number of times, an in-phase adder for batch addition of each correlation signal from the predetermined number of additions stored in the aforementioned first addition results storage memory, a second addition results storage memory for storing the addition results from the aforementioned in-phase adder when the addition has been completed the predetermined number of times in the aforementioned time slot, an electric power adder for batch reading the results for each time slot from the aforementioned second addition results storage memory and performing addition, and a path detection apparatus which executes a path detection according to the output of the aforementioned electric power adder.

Furthermore the present invention is characterized by a receiver for receiving CDMA system electric waves transmitted from a mobile station, equipped with a searcher comprising a correlator which receives input of a baseband signal which has been converted to a digital signal by a demodulator and an A/D converter in a wireless receiver, and which takes a reverse spread produced by the multiplication of the baseband signal and a spread code pilot symbol and outputs a correlation signal, an in-phase adder which, in each time slot, adds the correlation signal for the time slot a predetermined number of times, a first addition results storage memory for performing the addition process the predetermined number of times, a second addition results storage memory for storing the addition results from the aforementioned in-phase adder when the addition has been completed the predetermined number of times in the aforementioned time slot, an electric power adder for batch reading the results for each time slot from the aforementioned second addition results storage memory and performing addition, and a path detection apparatus which executes a path detection according to the output of the aforementioned electric power adder.

In summary, the present invention provides a configuration wherein by performing the delay profile addition process of the path detection using a sliding addition method, the number of times the path detection process is executed can be increased without inviting any deterioration in accuracy.

Furthermore, to describe the present invention with reference to FIG. 1, a correlator 1 determines, for each time slot (TS), the vector quantity correlation value of the input data sequence and the spread code +the pilot symbol for just the window width for which path detection is performed, and outputs this correlation value to an in-phase adder 2. Here, the pilot symbol indicates a known sequence which is periodically inserted into the transmission data in order to perform such functions as path detection and channel (CH) estimation. In the in-phase adder 2, the input vector quantity correlation value undergoes x addition iterations, and the addition results are stored in an addition results storage memory 4. Furthermore, the present invention also has a temporary storage memory 3 for the addition results. In the addition results storage memory 4, a region is reserved for the y addition iterations performed in an electric power adder 5 of a later stage. By storing results cyclically in this same region, once the addition results for y iterations have been stored, it becomes possible for the path detection apparatus 6 to be activated every x-th time slot.

BRIEF DESCRIPTION OF THE DRAWINGS

FIG. 12 is a diagram of a first embodiment illustrating a path detection method of the present invention.

FIG. 13 is a diagram of a second embodiment illustrating a path detection method of the present invention.

DETAILED DESCRIPTION OF THE INVENTION

The embodiments of the invention will be described in detail with reference to the drawings.

First Embodiment (1) Structural Description

Figure 1:
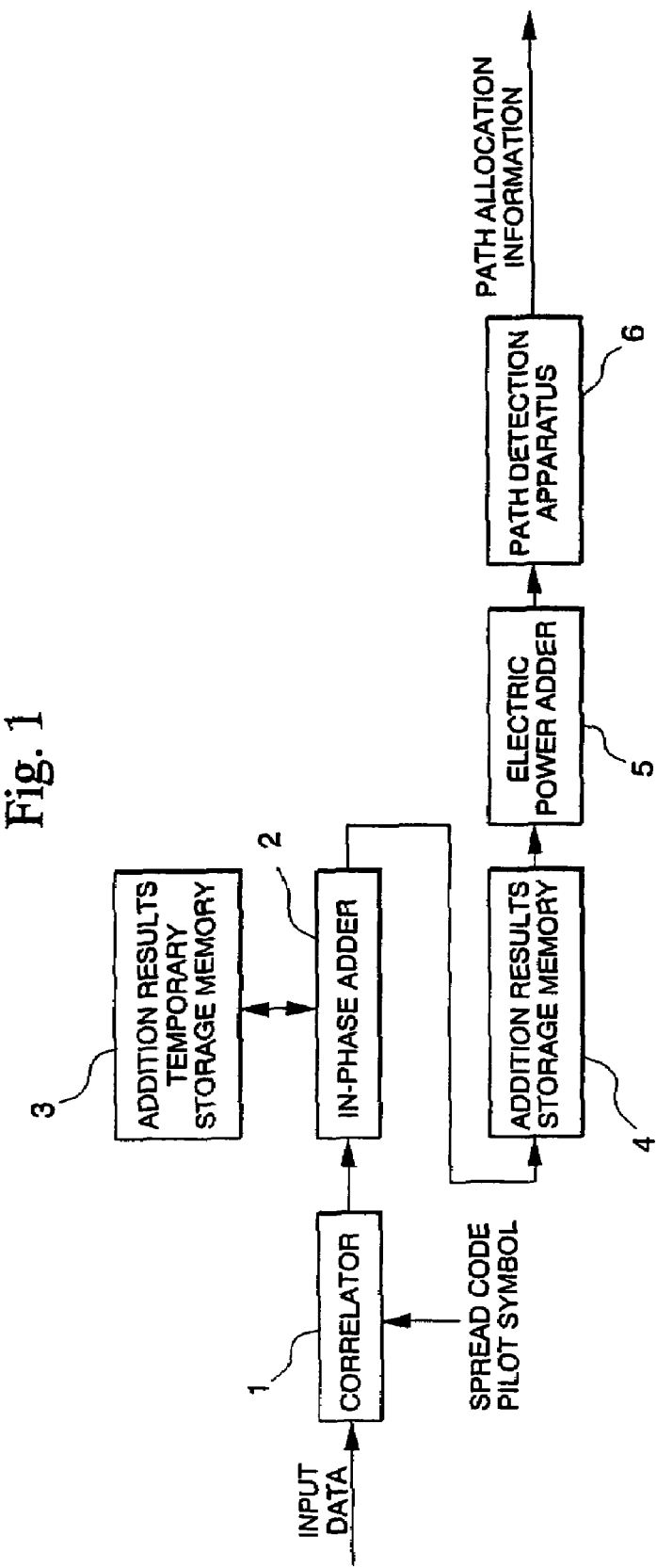
FIG. 1 is a block diagram showing the construction of an embodiment of the present invention.

As shown in FIG. 1 and FIG. 12, an embodiment of the path detection method according to the present invention comprises a correlator 1, an in-phase adder 2 and an addition result temporary storage memory 3 (this addition result temporary storage memory may also be referred to as "first memory") attached thereto, an addition results storage memory 4 (this addition results storage memory may also be referred to as "second memory"), an electric power adder 5 and a path detection apparatus 6.

A baseband signal is input into the correlator 1 after undergoing conversion to a digital signal by the demodulator and the A/D converter in the receiver, and the correlator 1 takes the reverse spread produced by the multiplication of the baseband signal and the spread code pilot symbol and outputs a correlation signal. Next, the in-phase adder 2 adds the correlation signal for each time slot a predetermined number of times. In this case, because adding is performed a predetermined number of times, the addition results are stored in the addition results temporary storage memory 3 for every time slot. If adding a predetermined number of addition iterations have been completed for the time slot, those addition results are stored in the storage memory 4. This addition results storage memory 4 stores as a shift register and sequentially batch reads in every time slot, for example. The electric power adder 5 adds in a batch style from the data stored in the addition results storage memory 4 for each time slot. Accordingly, the output of the electric power adder 5 fully uses the addition circuits from the storage area of each region of the addition results storage memory 4, and so is output after each accumulation of the predetermined number of iterations in the addition results temporary storage memory 3, and those results are output to the path detection apparatus 6.

Each of the above devices have the respective functions described below.

The correlator 1 performs correlation calculations of the input data sequence and the sequence where the pilot symbol is spread by the spread code, for the window width for which path detection is performed, and calculates a vector quantity correlation value.

The in-phase adder 2 performs x iterations of the addition process on the input vector quantity correlation value. The temporary data produced before the completion of x iterations is stored in the attached addition results temporary storage memory 3. After x iterations of the addition process (e.g., x=2 in FIG. 12) have been completed, the addition results (e.g., (a)+(b), (c)+(d) in FIG. 12) are converted to an electric power value (e.g., $A_1$, $A_2$, $A_3$, $A_4$ in FIG. 12) and output to the addition results storage memory 4. In those cases where orthogonal modulation is performed in the mobile station, the in-phase adder 2 performs vector addition of plane I and plane Q, and although there is no problem when the reference frequency of the base station is the same as the reference frequency of the mobile station, when the two reference frequencies differ, the phase components of the results of the vector addition may in some cases be detected as noise, and so the subsequent stage electric power adder 5 becomes effective.

In the addition results storage memory 4, only enough space is reserved to enable the storage of y iterations of electric power values (e.g., y=2 in FIG. 12) input from the in-phase adder 2, and so the electric power value which is input every xth time slot is stored cyclically for y iterations.

The electric power adder 5 may also have a low pass filter structure, wherein the value of the square of the component I of the orthogonal signal and the value of the square of the component Q of the orthogonal signal are added, the electric power values of y iterations stored in the addition results memory 4 are added, and the result is then output to the path detection apparatus 6 as the delay profile.

The path detection apparatus 6 performs threshold value processing on the input delay profile (strength and delay time), extracts highly accurate paths from the high level delay times of the delay profile and creates the path allocation information for each finger.

(2) Description of the Operation

As follows, the entire operation of the present invention is described in detail with reference to FIG. 1, FIG. 2, and FIG. 12.

Figure 2:
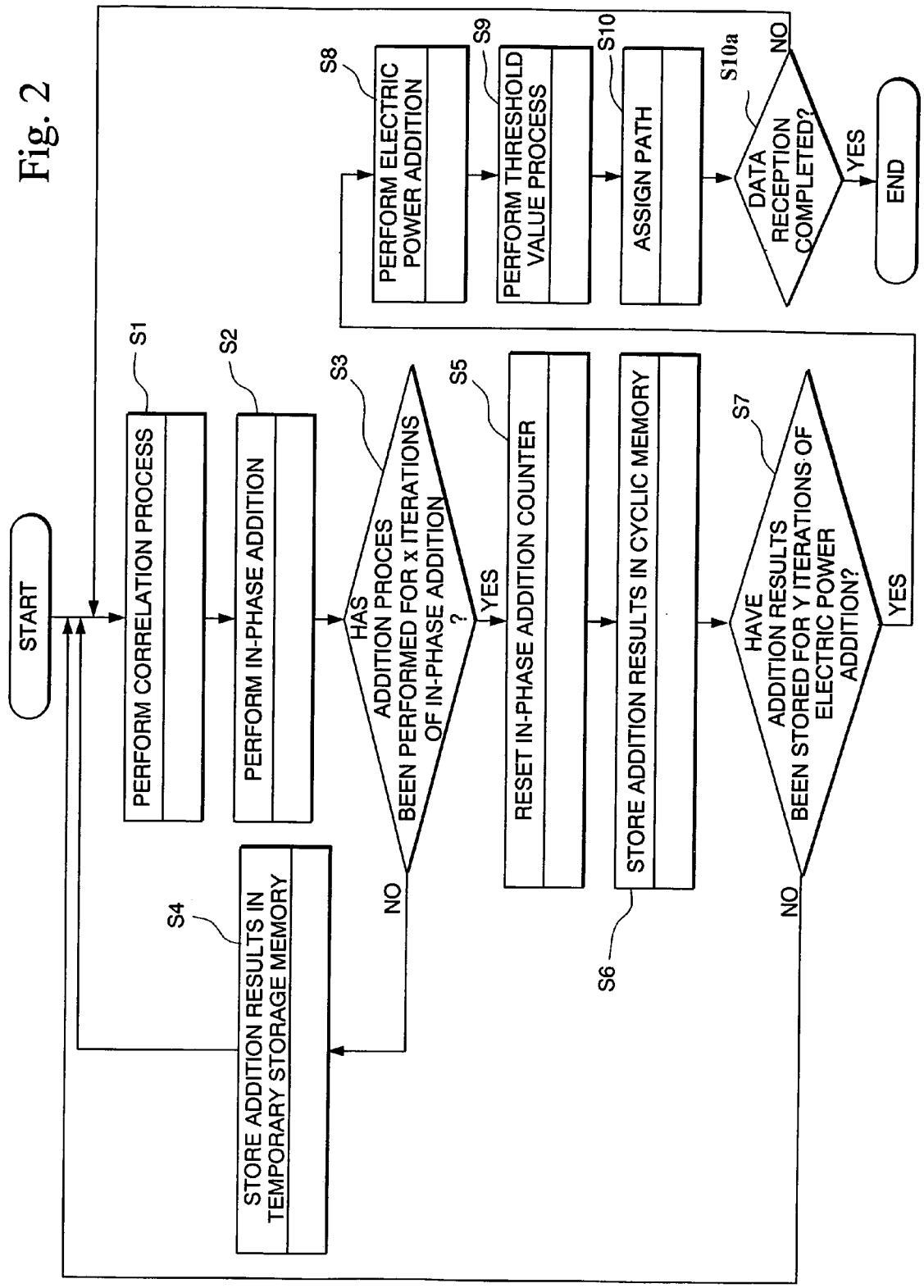
FIG. 2 is a flow chart describing the operation of the present invention.

Firstly, correlation processing is performed (see, e.g., stage 1 in FIG. 12) for the input data sequence in the correlator 1 (step S1 in FIG. 2). Specifically, correlation calculations of the input data sequence and the sequence where the pilot symbol is spread by the spread code which is assigned to each user, are conducted for the window width for which path detection is performed. Correlation calculation is performed for every time slot. Here, the correlation value (e.g., (a), (b), (c), (d), (e), (f), (g) and (h) in FIG. 12) output from the correlator 1 is a vector quantity.

Figure 3:
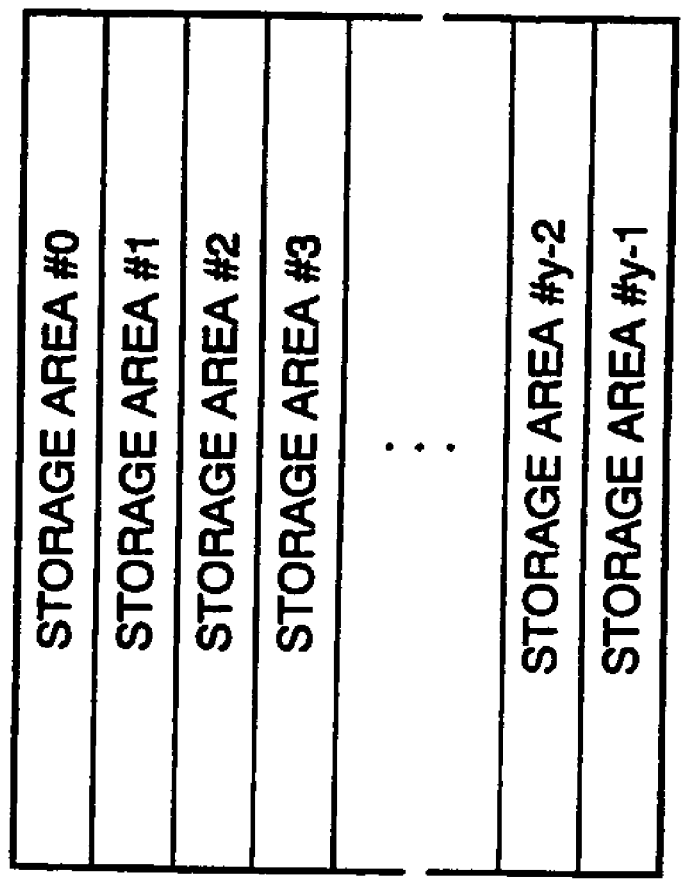
FIG. 3 is a diagram describing in detail the operation of the present invention.

Next, the in-phase addition process (see, e.g., stage 2 in FIG. 12) is performed in the in-phase adder 2 (step S2). Specifically, the correlation values of the input vector quantities undergo the addition process (e.g., (a)+(b) in FIG. 12) as a vector quantity. A judgement is made as to whether or not the correlation value has been added x number of times (step S3), and in the case where x addition iterations have been completed, the in-phase counter for counting the number of iterations of in-phase addition is reset, in preparation for the next in-phase addition cycle (step S5) (e.g., (c)+(d) in FIG. 12). In addition, the addition results are converted to a scalar quantity electric power value (e.g., $A_1$, $A_2$, $A_3$, $A_4$ in FIG. 12) and stored in the addition results storage memory 4 (step S6). Subsequently, a judgement is made as to whether or not y iterations of the electric power value have been stored (step S7). Here the addition results storage memory 4 generally indicates memory of a structure such as that shown in FIG. 3. According to FIG. 3, the addition results are stored in order from storage area #0, and storage data is stored up to storage area #y−1. Following full accumulation of the storage data, the next results are overwritten in order again from storage area #0. This means that the most recent y results are always stored. This addition results storage memory 4 may be high speed SRAM, DRAM, flash memory or the like, or may also be ring memory. Moreover, in step S3, in the case where the number of addition iterations has not yet reached x times, the addition results are stored in the addition result temporary storage memory 3 (step S4), and the process returns to step S1.

Next, in the case where the addition results from y electric power addition iterations (e.g., ($A_1+A_2$) in FIG. 12) have been stored, the electric power addition process (see, e.g., stage 3 in FIG. 12) is performed (step S8) in the electric power adder 5. Specifically, the results of the most recent y electric power values are added (e.g., ($A_2+A_3$), ($A_3+A_4$) in FIG. 12), and a delay profile (e.g., I, II, III in FIG. 12) is prepared.

Finally, in the path detection apparatus 6, the path to be assigned to each finger is determined from the prepared delay profile (steps S9, S10). Specifically, by performing threshold value processing (step S9) for the input delay profile, only highly accurate paths are extracted and assigned to each finger (step S10). Subsequently, a judgement is made as to whether or not the data to be received has finished (step S10a), and if the data is not finished the process returns to step S1. If the data has finished, the path detection process awaits the reception of the next data.

As follows, the operation will be further described using a specific example.

Figure 4:
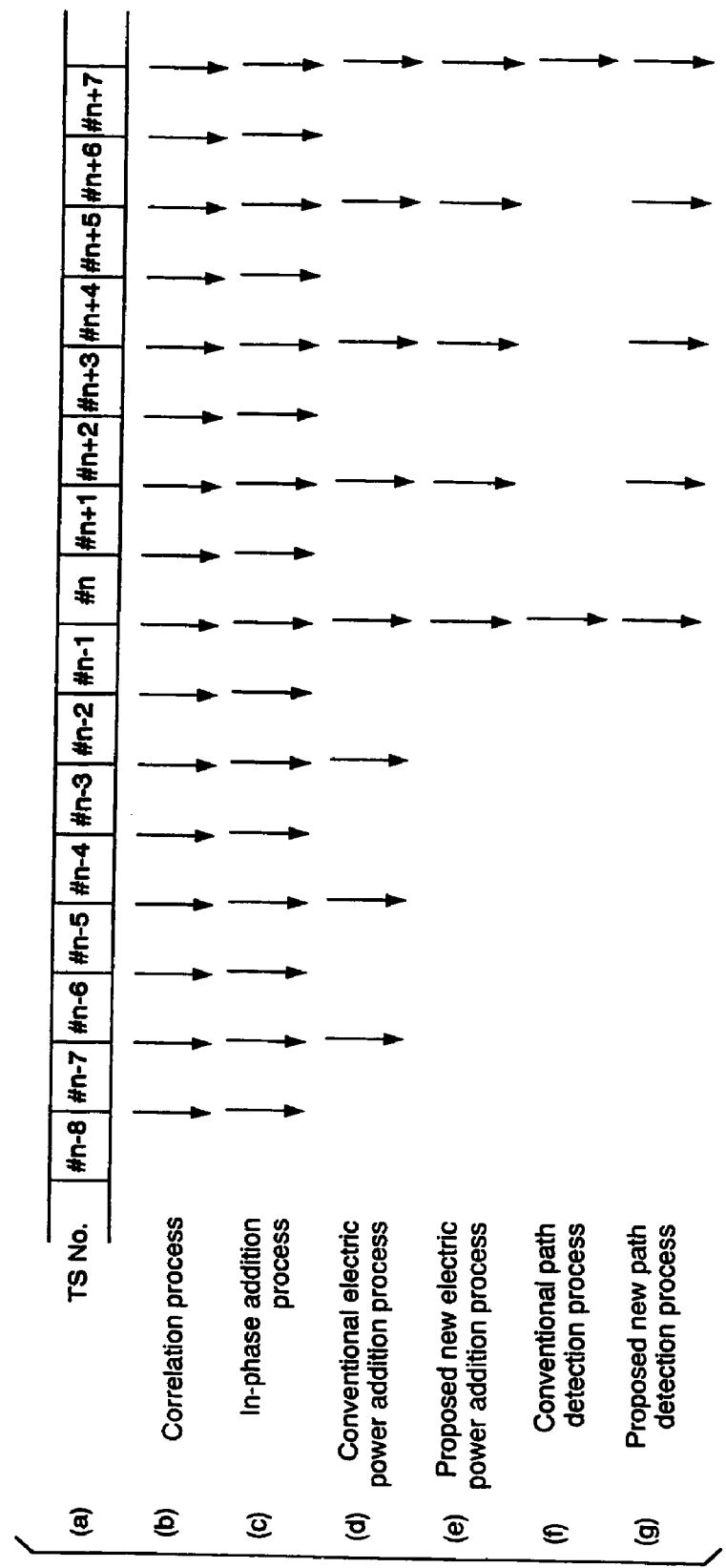
FIG. 4 is a diagram describing in detail the operation of the present invention.

FIG. 4 is an example showing timing charts executed by each block in FIG. 1, comparing a conventional method and the proposed method of the present embodiment. Here the number of in-phase additions is assumed to be x=2 and the number of electric power additions is assumed to be y=4. Furthermore, data input is assumed to have started from a time slot (TS) #n−8 (a). In FIG. 4, the correlation process results of the correlator 1 are output in each time slot (b), and the results of the in-phase addition process of the in-phase adder 2 are also output in each time slot (c).

Firstly, both the conventional method and the proposed method of the present embodiment are shown using an example wherein the results of the correlation process and the in-phase addition process performed for every TS are shown at the end point of each TS. In the conventional method, the process results of the electric power adder 23 are performed every second time slot TS (d), and the path detection apparatus 6 is activated in the time slots TS#n and TS#n+7 (f).

Figure 11:
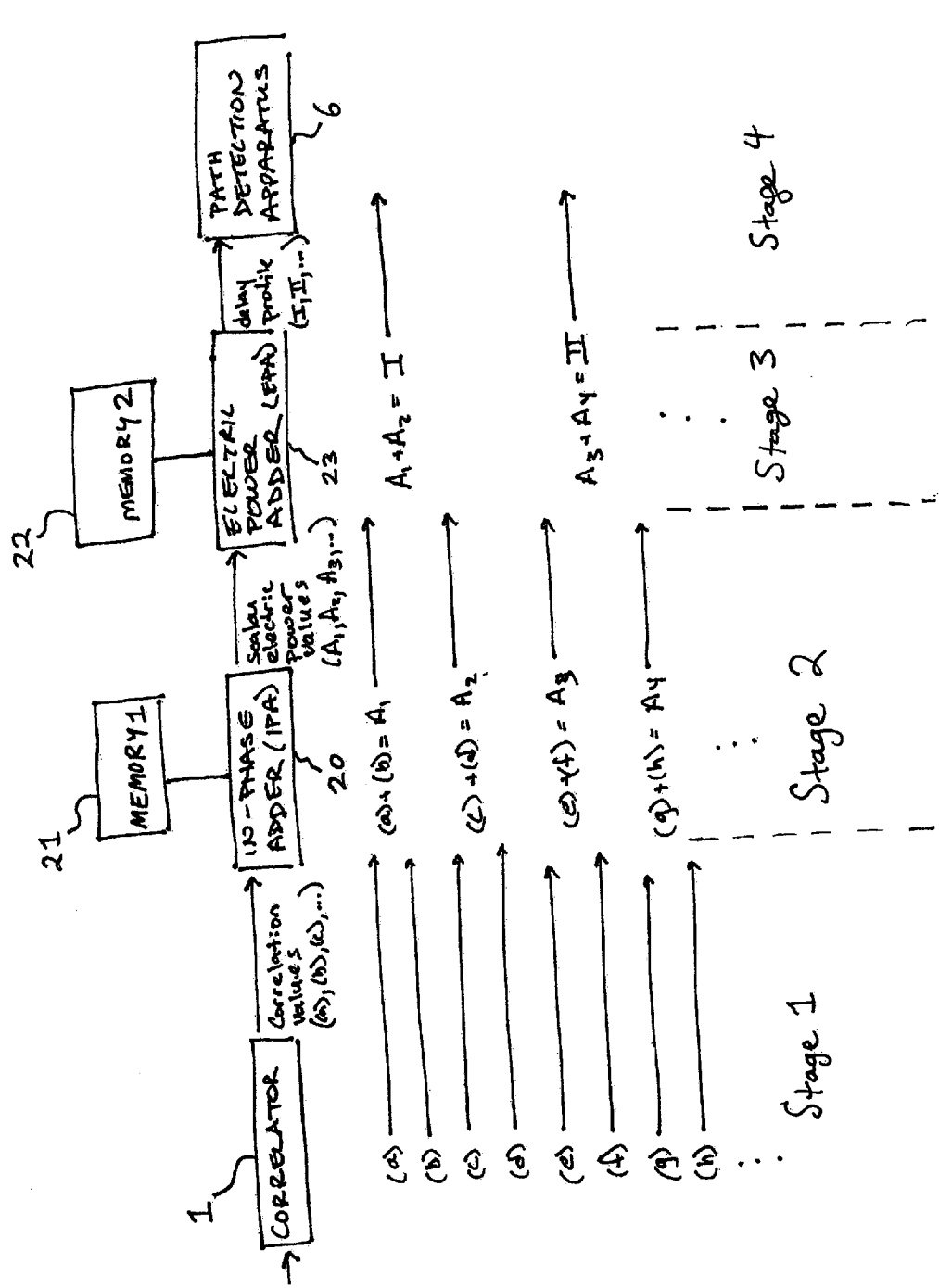
FIG. 11 is a diagram of an embodiment illustrating the path detection method according to conventional technology.

In contrast, in the method proposed in the present embodiment, the electric power addition process is performed in every second time slot TS from the time slot TS#n onward, and in the same manner, the path detection apparatus is also activated in every second time slot TS from the time slot TS#n onward. In other words, from the time slot TS#n onward, it becomes possible to increase the number of times the path detection process is activated, from the once in every eight time slots of the conventional method to once every second time slot in the present embodiment, without reducing the number of time slots in which addition of the correlation value is performed. (see, FIGS. 11 & 12 illustrating that the path detection process is activated two times (according to delay profiles I, II) for the first eight correlation values (e.g., (a), (b), (c), (d), (e), (f), (g) and (h)) according to the conventional path detection method whereas the path detection process is activated three times (according to delay profiles I, II, III) for the first eight correlation values according to the first embodiment of the present invention).

Second Embodiment

As follows, a path detection method according to a second embodiment of the present invention will be explained in detail with reference to the drawings.

Figure 5:
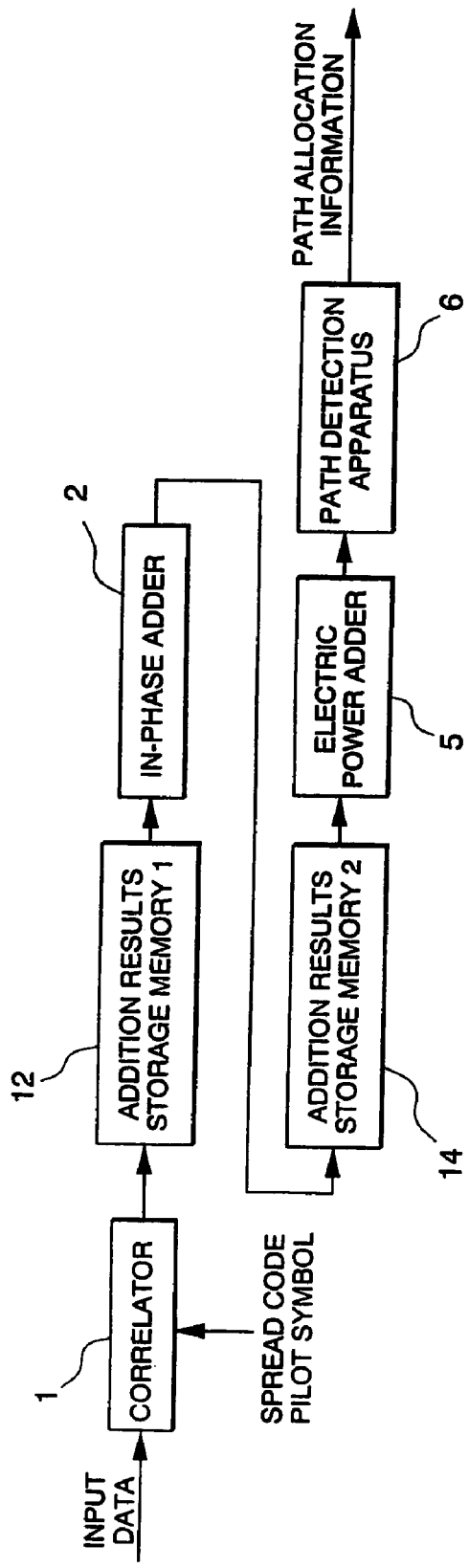
FIG. 5 is a block diagram showing the construction of another embodiment of the present invention.

As shown in FIG. 5 and FIG. 13, the second embodiment of the path detection method of the present invention comprises a correlator 1, an addition results storage memory 1 (numeral 12 in FIG. 5; this addition results storage memory may also be referred to as "first memory"), an in-phase adder 2, an addition results storage memory 2 (numeral 14 in FIG. 5; this addition results storage memory may also be referred to as "second memory"), an electric power adder 5 and a path detection apparatus 6, all of which are connected serially.

Each of the above devices are operated in the manner described below.

The correlator 1 performs correlation calculations (see, e.g., stage 1 of FIG. 13) of the input data sequence from the received baseband signal and the sequence where the pilot symbol is spread by the spread code, for the window width for which path detection is performed, and calculates a vector quantity correlation value (e.g., (a), (b), (c), (d), (e), (f), (g) and (h) in FIG. 13).

In the addition results storage memory 1 and 2 (numerals 12 and 14 in FIG. 5), only enough area for holding the correlation values input from the correlator 1 and the in-phase adder 2, namely x iterations (e.g., x=2 in FIG. 13) and y iterations (e.g., y=2 in FIG. 13) respectively, is reserved, and the correlation values of these x iterations and y iterations are stored cyclically.

The in-phase adder 2 performs the addition process (see, e.g., stage 2 in FIG. 13) on the x iterations of vector quantity correlation values (e.g., (a)+(b) in FIG. 13) stored in the addition results storage memory 1 (numeral 12 in FIG. 5). In addition, the in-phase adder 2 also converts the addition results to electric power values (e.g., $A_1, A_2, A_3, A_4, A_5, A_6, A_7$ in FIG. 13), which are output to the addition results storage memory 2 (numeral 14 in FIG. 5).

The electric power adder 5 adds the y iterations of electric power correlation values (e.g., $(A_1+A_2)$, $(A_2+A_3)$ in FIG. 13) stored in the addition results storage memory 2 (numeral 14 in FIG. 5), and outputs the result to the path detection apparatus 6 as a delay profile (e.g., I, II, III, IV, V and VI in FIG. 13).

The path detection apparatus 6 performs threshold value processing on the input delay profile, extracts paths of high accuracy, and creates the path allocation information for each finger.

Figure 6:
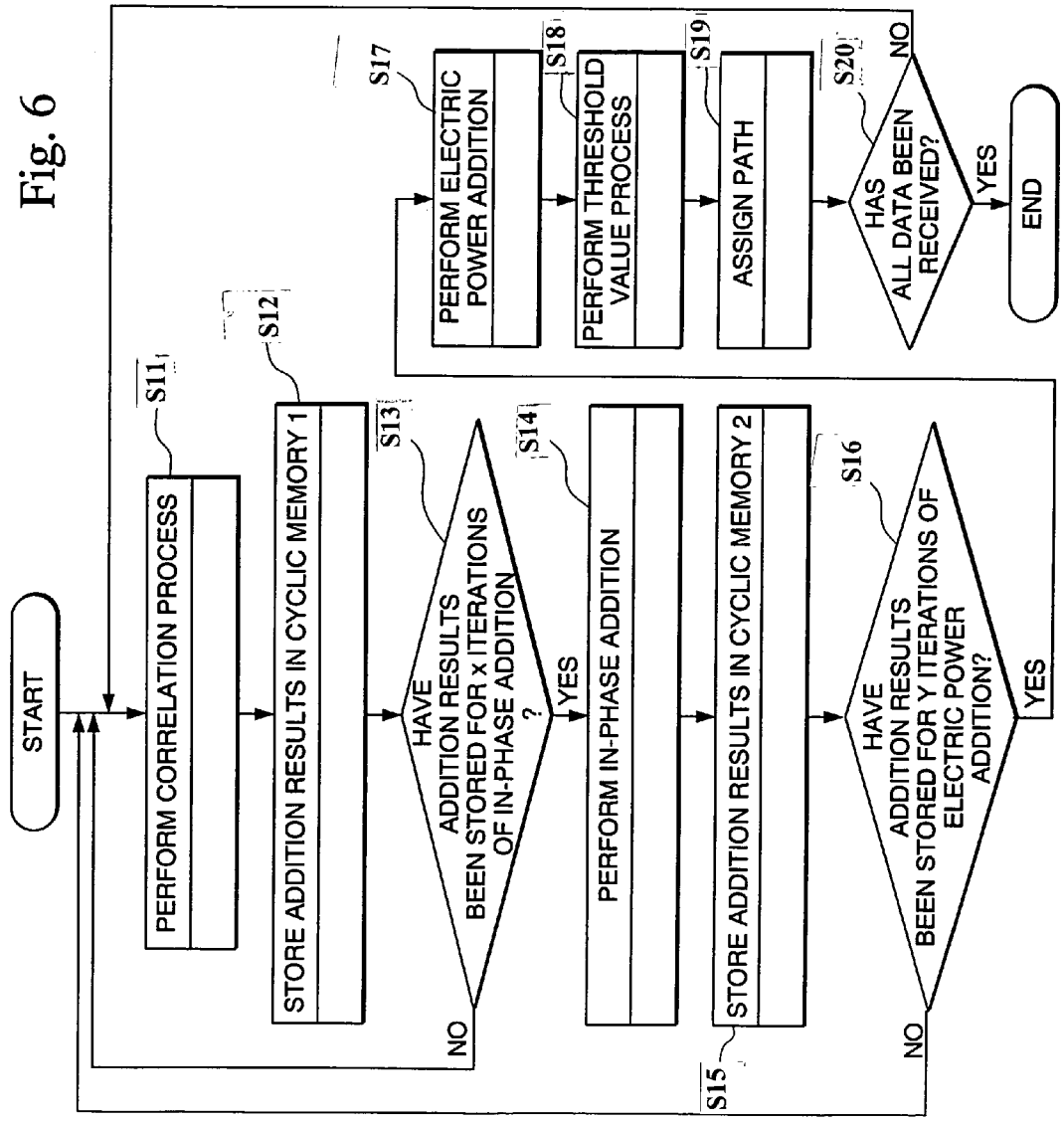
FIG. 6 is a flow chart describing the operation of another embodiment of the present invention.

Next, the entire operation of this second embodiment is described in detail, with reference to the flow charts of FIG. 5 and FIG. 6.

Firstly, correlation processing (see, e.g., stage 1 in FIG. 13) is performed for the input data sequence in the correlator 1 (step S11 in FIG. 6). Specifically, correlation calculations of the input data sequence and the sequence where the pilot symbol is spread by the spread code which is assigned to each user, are conducted for the window width for which path detection is performed. These correlation calculations are performed for every time slot. Here, the correlation value (e.g., (a), (b), (c), (d), (e), (f), (g) and (h) in FIG. 13) output from the correlator 1 is a vector quantity.

The results of the correlation calculation are stored cyclically (step S12) in the addition results storage memory 1 (numeral 12 in FIG. 5). A judgement is then made by the in-phase adder 2 as to whether or not the addition results from x iterations of in-phase addition have been stored (step S13), and if the number of addition results has not yet reached the number x, the process returns to step S11.

Next, the in-phase addition process (see, e.g., stage 2 in FIG. 13) is performed in the in-phase adder 2 (step S14). Specifically, the addition process is performed on the x iterations of vector quantity correlation values stored in the addition results memory 1 (12 in FIG. 5), with the addition process performed on the vector quantities (e.g., (a)+(b), (b)+(c) in FIG. 13). The addition results are converted to scalar electric power values (e.g., $A_1, A_2, A_3, A_4, A_5, A_6$ and $A_7$ in FIG. 13) and stored cyclically (step S15) in the addition results storage memory 2 (numeral 14 in FIG. 5)

Next, a judgement is made as to whether y iterations of electric power addition results are stored in the addition results storage memory 2 (step S16), and if y iterations have been stored, the electric power addition process (see, e.g., stage 3 in FIG. 13) is performed in the electric power adder 5 (step S17). Specifically, the results of the most recent y electric power values are added (e.g., $(A_1+A_2)$, $(A_2+A_3)$, $(A_3+A_4)$ in FIG. 13), and a delay profile (e.g., I, II, III, IV, V and VI in FIG. 13) is prepared. If y iterations are not stored, the process returns to step S11.

Based on the results of the electric power addition process executed in the electric power adder 5, the path detection apparatus 6 determines the path to be assigned to each finger from the delay profile (steps S18, S19). Specifically, by performing threshold value processing (step S18) on the input delay profile, paths with high accuracy are extracted, and the allocation information for each finger is prepared (step S19). Subsequently, a judgment is made as to whether or not data to be received has finished (step S20), and if the data is not finished the process returns to step S11. If the data has finished, the path detection process awaits the reception of the next data.

Next, the embodiment will be further described using a specific example.

Figure 7:
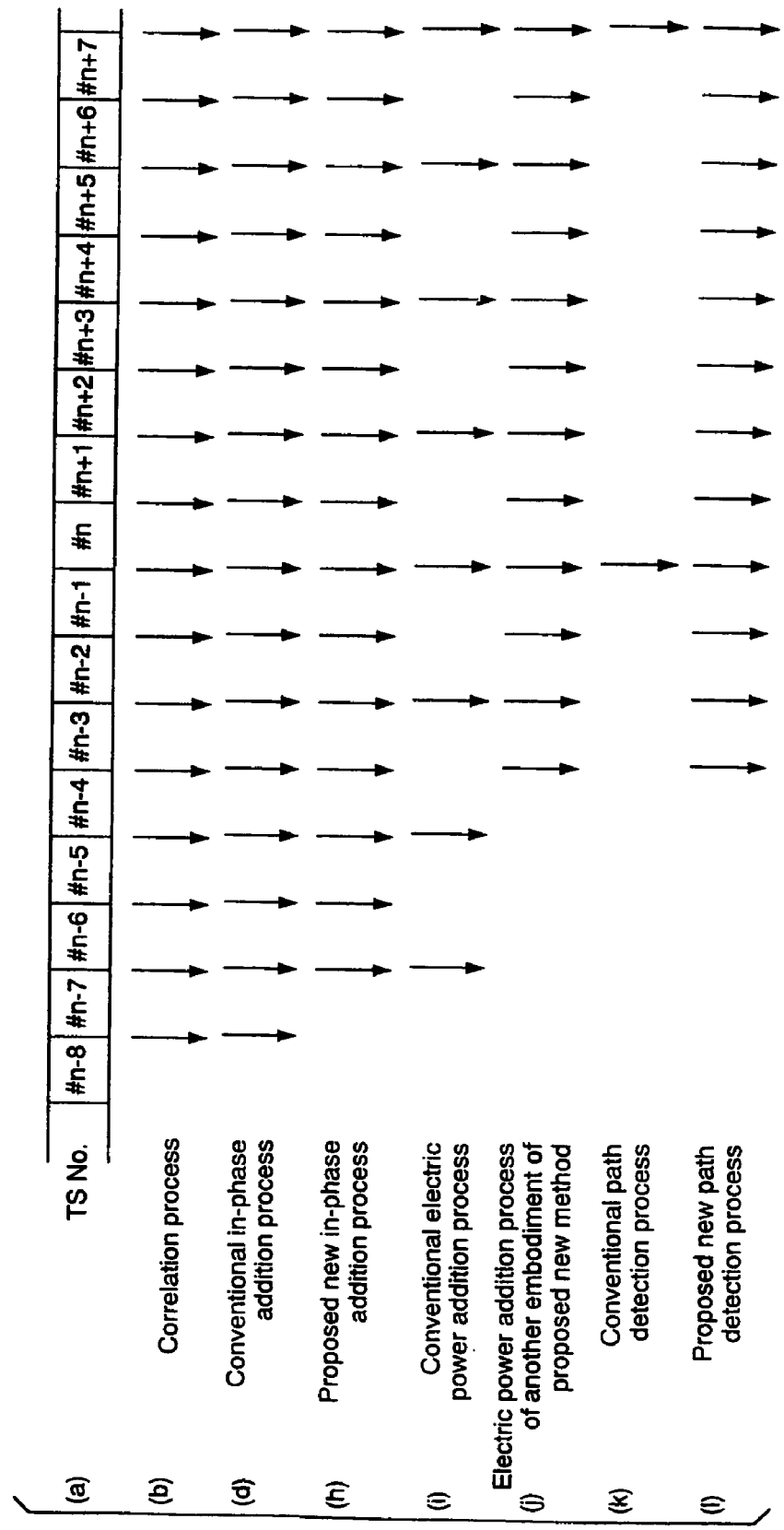
FIG. 7 is a diagram describing in detail the operation of another embodiment of the present invention.

FIG. 7 is an example showing timing charts executed by each block in FIG. 5, comparing a conventional method and the proposed method of the present embodiment. Here the number of in-phase additions is assumed to be x=2 and the number of electric power additions is assumed to be y=4. Furthermore, data input is assumed to have started from a time slot (TS) #n−8. FIG. 7 shows time slots (TS) #n−8 to #n+7, and the output state of the correlation process at the end point of each time slot.

Firstly, the correlation process is performed in every time slot TS in both the conventional method and the proposed method of the present invention (b). In the conventional method, the in-phase addition process is also performed in every time slot TS (d), the electric power addition process is performed in every second time slot TS (i), and the path detection apparatus is activated in the time slot TS #n and the time slot TS #n+7 (k).

In contrast, in the present embodiment the in-phase addition process is performed for every time slot TS from TS #n−7 onward (h) by the shift register memory function of the addition results storage memory 1 (numeral 12), the electric power addition process is performed in every time slot TS from the (2+4−1)th iteration of each memory, namely from the time slot TS #n−3 onward (j), by the shift register function of the next addition results storage memory 2, and in addition, the path detection apparatus 6 is activated in every time slot TS from TS #n−3 onward, in the same manner (1). In other words, it becomes possible, from the time slot TS #n−3 onward, to increase the number of times the path detection process is activated from the conventional once every eight time slots TS to once every time slot TS, without reducing the number of time slots in which the correlation value is added. Consequently, because the path detection results can be implemented in each time slot, the optimum path can be selected and received in each time slot, and consequently high quality communication becomes possible. (see, FIGS. 11 and 13 illustrating that the path detection process is activated two times (according to delay profiles I, II) for the first eight correlation values ((e.g., (a), (b), (c), (d), (e), (f), (g) and (h)) according to the conventional path detection method, whereas the path detection process is activated six times (according to delay profiles I, II, III, IV, V and VI) for the first eight correlation values according to the second embodiment of the present invention).

Figure 10:
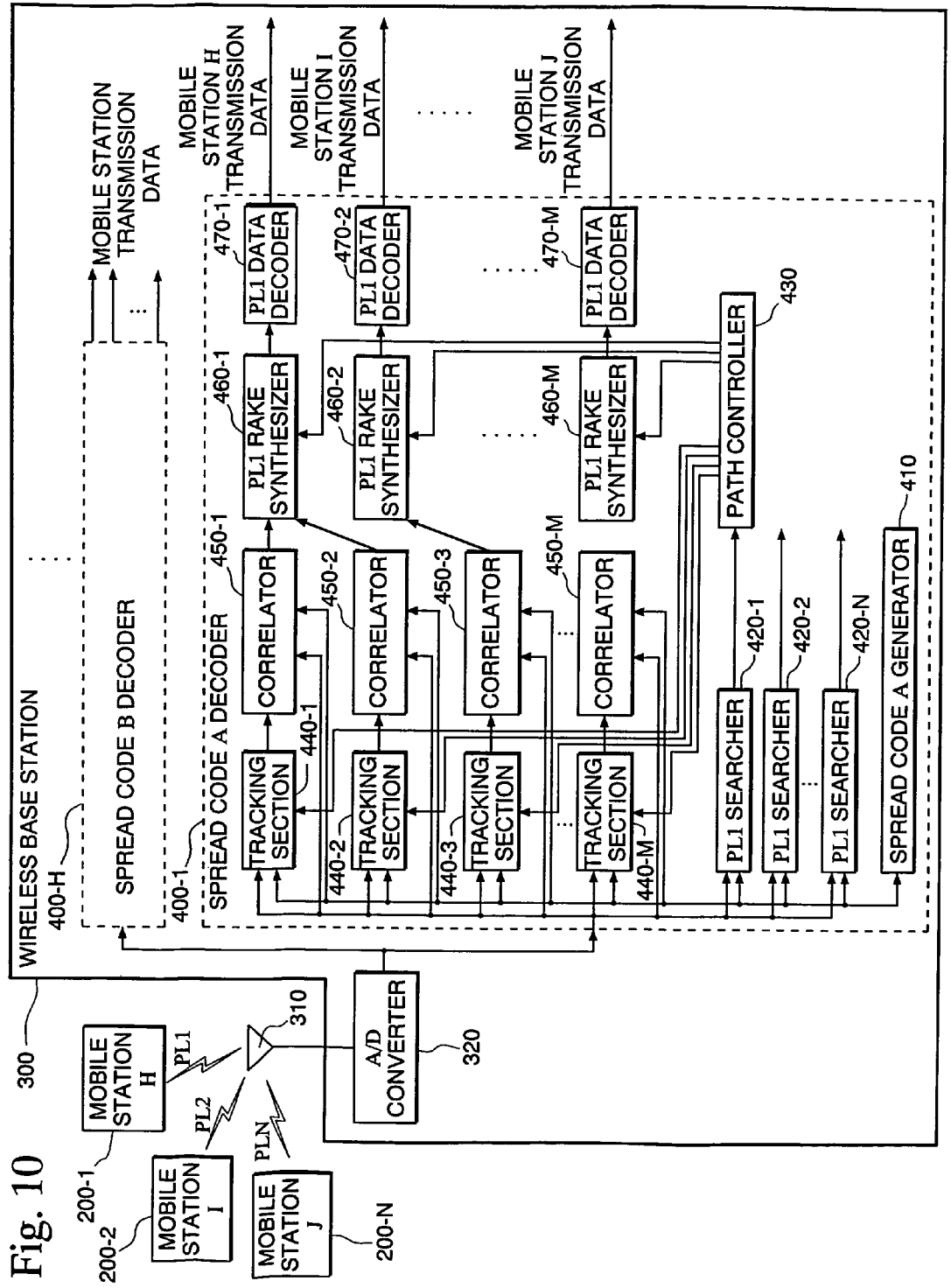
FIG. 10 is a structural block diagram of a wireless base station according to conventional technology.

In the aforementioned embodiments, path detection methods were described which enabled output in every second time slot or in every time slot, but if this path detection apparatus is used in place of the PL searcher 420 in the receiver of the conventional technology base station shown in FIG. 10, the path is synthesized in the RAKE synthesizer 470 via the path controller 430, and by subsequent demodulation by the data decoder 470, the data transmitted from the mobile station can be optimally received. Consequently, by applying the present invention to the conventional spread code decoder 400, high quality reception performance can be achieved. According to FIG. 10, the number of PL searchers 420 needed is the same as the number of mobile stations to be managed.

By storing addition results cyclically, the present invention can always activate the path detection process using the addition results of the most recent addition cycle time slot, and so the number of times the path detection process is activated can be increased without any loss in accuracy.

Consequently, even in the case of an environment where path variation occurs rapidly, it is still possible to increase the number of times the path detection process is activated, without reducing the number of correlation values to be added, even when compared with the conventional technology, and consequently improvement in the compliance in the propagation environment can be expected.

What is claimed is:

1. A receiver for receiving CDMA system electric waves transmitted from a mobile station equipped with a searcher, comprising:
   a correlator which receives input of a baseband signal which has been converted to a digital signal by a demodulator and an A/D converter in a wireless receiver and which performs a reverse spread process by multiplication of said baseband signal and a spread code pilot symbol and consecutively outputs a plurality of correlation values, where each of the plurality of correlation values corresponds to a time slot of an input data signal;
   an in-phase adder which receives the plurality of correlation values, and stores x received correlation values in a first addition results storage memory, where x is an integer greater than or equal to 2, and
   wherein said in-phase adder retrieves the stored correlation values, adds the stored correlation values, and converts the added correlation values into an electric power value;
   a second addition results storage memory for storing y electric power values output from said in-phase adder, where y is an integer greater than or equal to 2;
   an electric power adder which batch reads the stored v electric power values from the second addition results storage memory, adds the stored electric power values, and which converts the added electric power values into a delay profile; and
   a path detection apparatus for executing a path detection based on the delay profile output from said electric power adder,
   wherein said second addition results storage memory reserves only enough space to enable storage of y electric power values input from said in-phase adder, and
   wherein said path detection apparatus performs threshold value processing on said delay profile, extracts a highly accurate path, and outputs said path to a RAKE synthesizer.

2. The receiver according to claim 1, wherein the plurality of correlation values are vector quantities.

3. A path detection method, comprising:
   (a) consecutively receiving a plurality of correlation values at an in-phase adder, wherein each correlation value corresponds to a time slot of an input data signal;
   (b) storing x received correlation values in a first memory, wherein x is an integer greater than or equal to 2;
   (c) retrieving the stored correlation values from the first memory at the in-phase adder, adding the stored correlation values, and converting the added correlation values into a scalar electric power value;
   (d) repeating steps (a) through (c) upon the reception of x new correlation values at the in-phase adder;
   (e) consecutively receiving the scalar electric power values at a second memory;
   (f) storing y scalar electric power values in the second memory, wherein y is an integer greater than or equal to 2;
   (g) retrieving the stored scalar electric power values from the second memory at an electric power adder, adding the stored scalar electric power values, and converting the added scalar electric power values into a delay profile;
   (h) upon retrieval of the stored scalar electric power values, erasing the oldest scalar electric power value from the second memory, thereby leaving y−1 scalar electric power values in the second memory, and
   (i) repeating steps (f) through (h) upon the reception of a new scalar electric power value at the second memory, such that the electric power adder re-uses the y−1 scalar electric power values remaining in the second memory in a subsequent addition; and
   (j) executing path detection based on the received delay profiles.

4. The method according to claim 3, wherein x is equal to 2 and wherein y is equal to 4.

5. The method according to claim 3, wherein x is equal to 2 and wherein y is equal to 2.

6. The method according to claim 3, wherein the plurality of correlation values are vector quantities.

7. The method according to claim 3, wherein the second memory reserves only enough space to enable storage of y scalar electric power values.

8. The method according to claim 3, wherein the step of executing path detection is performed by a path detection apparatus, which performs threshold value processing on the delay profiles.

9. A path detection method, comprising:
   (a) consecutively receiving a plurality of correlation values at a first memory, wherein each correlation value corresponds to a time slot of an input data signal;
   (b) storing x received correlation values in the first memory, wherein x is an integer greater than or equal to 2;
   (c) retrieving the stored correlation values from the first memory at an in-phase adder, adding the stored correlation values, and converting the added correlation values into a scalar electric power value;
   (d) upon retrieval of the stored correlation values, erasing the oldest correlation value from the first memory, thereby leaving x−1 correlation values in the first memory, and
   (e) repeating steps (a) through (d) upon the reception of a new correlation value at the first memory, such that the in-phase adder re-uses the x−1 correlation values remaining in the first memory in a subsequent addition;
   (f) consecutively receiving the scalar electric power values at a second memory;
   (g) storing y scalar electric power values in the second memory, wherein y is an integer greater than or equal to 2;
   (h) retrieving the stored scalar electric power values from the second memory at an electric power adder, adding the stored scalar electric power values, and converting the added scalar electric power values into a delay profile;
(i) upon retrieval of the stored scalar electric power values, erasing the oldest scalar electric power value from the second memory, thereby leaving y−1 scalar electric power values in the second memory, and
(j) repeating steps (g) through (i) upon the reception of a new scalar electric power value at the second memory, such that the electric power adder re-uses the y−1 scalar electric power values remaining in the second memory in a subsequent addition; and
(k) executing path detection based on the received delay profiles.

10. The method according to claim 9, wherein x is equal to 2 and wherein y is equal to 4.

11. The method according to claim 9, wherein x is equal to 2 and wherein y is equal to 2.

12. The method according to claim 9, wherein the plurality of correlation values are vector quantities.

13. The method according to claim 9, wherein the first memory reserves only enough space to enable storage of x received correlation values.

14. The method according to claim 9, wherein the second memory reserves only enough space to enable storage of y scalar electric power values.

15. The method according to claim 9, wherein the step of executing path detection is performed by a path detection apparatus, which performs threshold value processing on the delay profiles.

16. A path detection method, comprising:
(a) consecutively receiving a plurality of correlation values at a first memory, wherein each correlation value corresponds to a time slot of an input data signal;
(b) storing x received correlation values in the first memory, wherein x is an integer greater than or equal to 2;
(c) retrieving the stored correlation values from the first memory at an in-phase adder, adding the stored correlation values, and converting the added correlation values into a scalar electric power value;
(d) upon retrieval of the stored correlation values, erasing the oldest correlation value from the first memory, thereby leaving x−1 correlation values in the first memory, and
(e) repeating steps (a) through (d) upon the reception of a new correlation value at the first memory, such that the in-phase adder re-uses the x−1 correlation values remaining in the first memory in a subsequent addition;
(f) consecutively receiving the scalar electric power values at an electric power adder;
(g) storing y received scalar electric power values in a second memory, wherein y is an integer greater than or equal to 2;
(h) retrieving the stored scalar electric power values from the second memory at the electric power adder, adding the stored scalar electric power values, and converting the added scalar electric power values into a delay profile;
(i) upon retrieval of the stored scalar electric power values, erasing the previously received y scalar electric power values from the second memory, and
(j) repeating steps (g) through (i) upon the reception of y new scalar electric power values at the second memory; and
(k) executing path detection based on the received delay profiles.

17. The method according to claim 16, wherein x is equal to 2 and wherein y is equal to 4.

18. The method according to claim 16, wherein x is equal to 2 and wherein y is equal to 2.

19. The method according to claim 16, wherein the plurality of correlation values are vector quantities.

20. The method according to claim 16, wherein the first memory reserves only enough space to enable storage of x received correlation values.

21. The method according to claim 16, wherein the step of executing path detection is performed by a path detection apparatus which performs threshold value processing on the delay profiles.

22. A receiving system for path detection, comprising:
correlation means for consecutively outputting a plurality of correlation values, wherein each output correlation value corresponds to a timeslot of an input baseband signal;
a first memory means for storing the correlation values;
an in-phase adder means for:
storing x correlation values in the first memory means, where x is an integer greater than or equal to 2,
retrieving the stored correlation values from the first memory means,
adding the retrieved correlation values, and
converting the added correlation values into a scalar electric power value;
a second memory means for storing y electric power values, where y is an integer greater than or equal to 2;
an electric power adder means for:
a) retrieving the stored electric power values from the second memory means,
b) converting the retrieved electric power values into a delay profile,
c) upon retrieval of the stored scalar electric power values, erasing the oldest scalar electric power value from the second memory means, thereby leaving y−1 scalar electric power values in the second memory means, and
repeating steps (a) through (c) upon the reception of a new scalar electric power value at the second memory means, such that the electric power adder means re-uses the y−1 scalar electric power values remaining in the second memory means in a subsequent addition; and
a path detection means for executing path detection based on the delay profiles.

23. The receiving system according to claim 22, wherein the second memory means reserves only enough space to store y scalar electric power values therein.

24. A receiving system for path detection, comprising:
a correlator that consecutively outputs a plurality of correlation values, wherein each output correlation value corresponds to a timeslot of an input baseband signal;
a first memory that stores the correlation values;
an in-phase adder that:
stores x correlation values in the first memory, where x is an integer greater than or equal to 2,
retrieves the stored correlation values from the first memory,
adds the retrieved correlation values, and
converts the added correlation values into scalar electric power values;

a second memory means that stores y electric power values, where y is an integer greater than or equal to 2;
an electric power adder that
  (a) retrieves stored electric power values from the second memory,
  (b) converts the retrieved electric power values into a delay profile, and
  (c) upon retrieval of the stored electric power values, erases the oldest electric power value from the second memory, thereby leaving y−1 scalar electric power values in the second memory means, and
  repeats steps (a) through (c) upon the reception of a new scalar electric power value at the second memory, such that the electric power adder reuses the y−1 electric scalar power values remaining in the second memory in a subsequent addition; and
a path detection apparatus that executes path detection based on the delay profiles.

25. The receiving system according to claim 24, wherein the second memory reserves only enough space to store y scalar electric power values therein.

26. A receiving system for path detection, comprising:
correlation means for consecutively outputting a plurality of correlation values, wherein each output correlation value corresponds to a timeslot of an input baseband signal;
a first memory means for storing the correlation values;
an in-phase adder means for:
  (a) storing x correlation values in the first memory means, where x is an integer greater than or equal to 2,
  (b) retrieving the stored correlation values from the first memory means,
  (c) adding the retrieved correlation values,
  (d) converting the added correlation values into scalar electric power values,
  (e) upon retrieval of the stored correlation values, erasing the oldest stored correlation values form the first memory means, thereby leaving x−1 correlation values in the first memory means, and
  repeating steps (a) through (e) upon the reception of a new correlation value at the first memory means, such that the in-phase adder means reuses the x−1 correlation values remaining in the first memory means in a subsequent addition;
second memory means for storing y electric power values, where y is an integer greater than or equal to 2;
an electric power adder means for:
  (f) retrieving stored scalar electric power values form the second memory means,
  (g) converting the retrieved scalar electric power values into a delay profile,
  (h) upon retrieval of the stored scalar electric power values, erasing the oldest scalar electric power value from the second memory means, thereby leaving y−1 scalar electric power values in the second memory means, and
  repeating steps (f) through (h) upon the reception of a new scalar electric power value at the second memory means, such that the electric power adder means reuses the y−1 scalar electric power values remaining in the second memory means in a subsequent addition; and
a path detection means for executing path detection based on the delay profiles.

27. The receiving system according to claim 26, wherein the first memory means reserves only enough space to store x correlation values therein and wherein the second memory means reserves only enough space to store y scalar electric power values therein.

28. A receiving system for path detection, comprising:
a correlator that consecutively outputs a plurality of correlation values, wherein each output correlation value corresponds to a timeslot of an input baseband signal;
a first memory that stores the correlation values;
an in-phase adder that:
  (a) stores x correlation values in the first memory means, where x is an integer greater than or equal to 2,
  (b) retrieves the stored correlation values from the first memory means,
  (c) adds the retrieved correlation values,
  (d) converts the added correlation values into scalar electric power values,
  (e) upon retrieval of the stored correlation values, erases the oldest stored correlation values form the first memory means, thereby leaving x−1 correlation values in the first memory means, and
  repeats steps (a) through (e) upon the reception of a new correlation value at the first memory means, such that the in-phase adder means reuses the x−1 correlation values remaining in the first memory means in a subsequent addition;
a second memory that stores y electric power values, where y is an integer greater than or equal to 2;
an electric power adder that:
  (f) retrieves stored scalar electric power values form the second memory means,
  (g) converts the retrieved scalar electric power values into a delay profile,
  (h) upon retrieval of the stored scalar electric power values, erases the oldest scalar electric power value from the second memory means, thereby leaving y−1 scalar electric power values in the second memory means, and
  repeats steps (f) through (h) upon the reception of a new scalar electric power value at the second memory means, such that the electric power adder means reuses the y−1 scalar electric power values remaining in the second memory means in a subsequent addition; and
a path detection apparatus that executes path detection based on the delay profiles.

29. The receiving system according to claim 28, wherein the first memory reserves only enough space to store x correlation values therein and wherein the second memory reserves only enough space to store y scalar electric power values therein.

30. A receiving system for path detection, comprising:
correlation means for consecutively outputting a plurality of correlation values, wherein each output correlation value corresponds to a timeslot of an input baseband signal;
a first memory means for storing the correlation values;
an in-phase adder means for:
  (a) storing x correlation values in the first memory means, where x is an integer greater than or equal to 2,
  (b) retrieving the stored correlation values from the first memory means,
  (c) adding the retrieved correlation values,
  (d) converting the added correlation values into scalar electric power values, (e) upon retrieval of the stored correlation values, erasing the oldest stored correlation values form the first memory means, thereby leaving x–1 correlation values in the first memory means, and repeating steps (a) through (e) upon the reception of a new correlation value at the first memory means, such that the in-phase adder means reuses the x–1 correlation values remaining in the first memory means in a subsequent addition;

a second memory means for storing y scalar electric power values, where y is an integer greater than or equal to 2;

an electric power adder means for:

(f) retrieving the stored scalar electric power values form the second memory, (g) adding the retrieved scalar electric power values, (h) converting the added scalar electric power values into a delay profiles, and (i) upon retrieval of the stored scalar electric power values, erasing the stored scalar electric power values from the second memory means, and repeating steps (f) through (i) upon the reception of y new scalar electric power values at the second memory means;

a path detection means for executing path detection based on the delay profiles.

31. The receiving system according to claim 30, wherein the first memory means reserves only enough space to store x correlation values therein.

32. A receiving system for path detection, comprising:

a correlator that consecutively outputs a plurality of correlation values, wherein each output correlation value corresponds to a timeslot of an input baseband signal;

a first memory that stores the correlation values;

an in-phase adder that:

(a) stores x correlation values in the first memory means, where x is an integer greater than or equal to 2, (b) retrieves the stored correlation values from the first memory means, (c) adds the retrieved correlation values, (d) converts the added correlation values into scalar electric power values, (e) upon retrieval of the stored correlation values, erases the oldest stored correlation values form the first memory means, thereby leaving x–1 correlation values in the first memory means, and repeats steps (a) through (e) upon the reception of a new correlation value at the first memory means, such that the in-phase adder means reuses the x–1 correlation values remaining in the first memory means in a subsequent addition;

a second memory that stores y scalar electric power values, where y is an integer greater than or equal to 2;

an electric power adder that:

(f) retrieves the stored scalar electric power values form the second memory, (g) adds the retrieved scalar electric power values, (h) converts the added scalar electric power values into a delay profiles, and (i) upon retrieval of the stored scalar electric power values, erases the stored scalar electric power values from the second memory means, and repeats steps (f) through (i) upon the reception of y new scalar electric power values at the second memory means;

a path detection apparatus that executing path detection based on the delay profiles.

33. The receiving system according to claim 32, wherein the first memory reserves only enough space to store x correlation values therein.

* * * * *

UNITED STATES PATENT AND TRADEMARK OFFICE
CERTIFICATE OF CORRECTION

Figure 8:
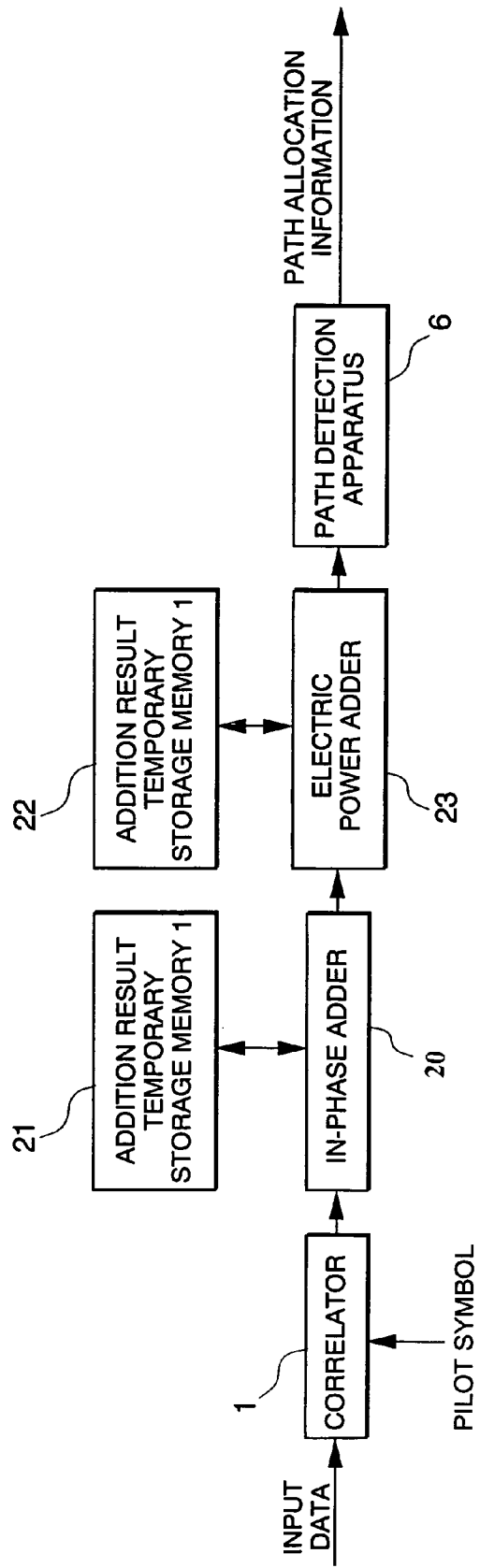
FIG. 8 is a block diagram showing the construction of an embodiment according to conventional technology.
Figure 9:
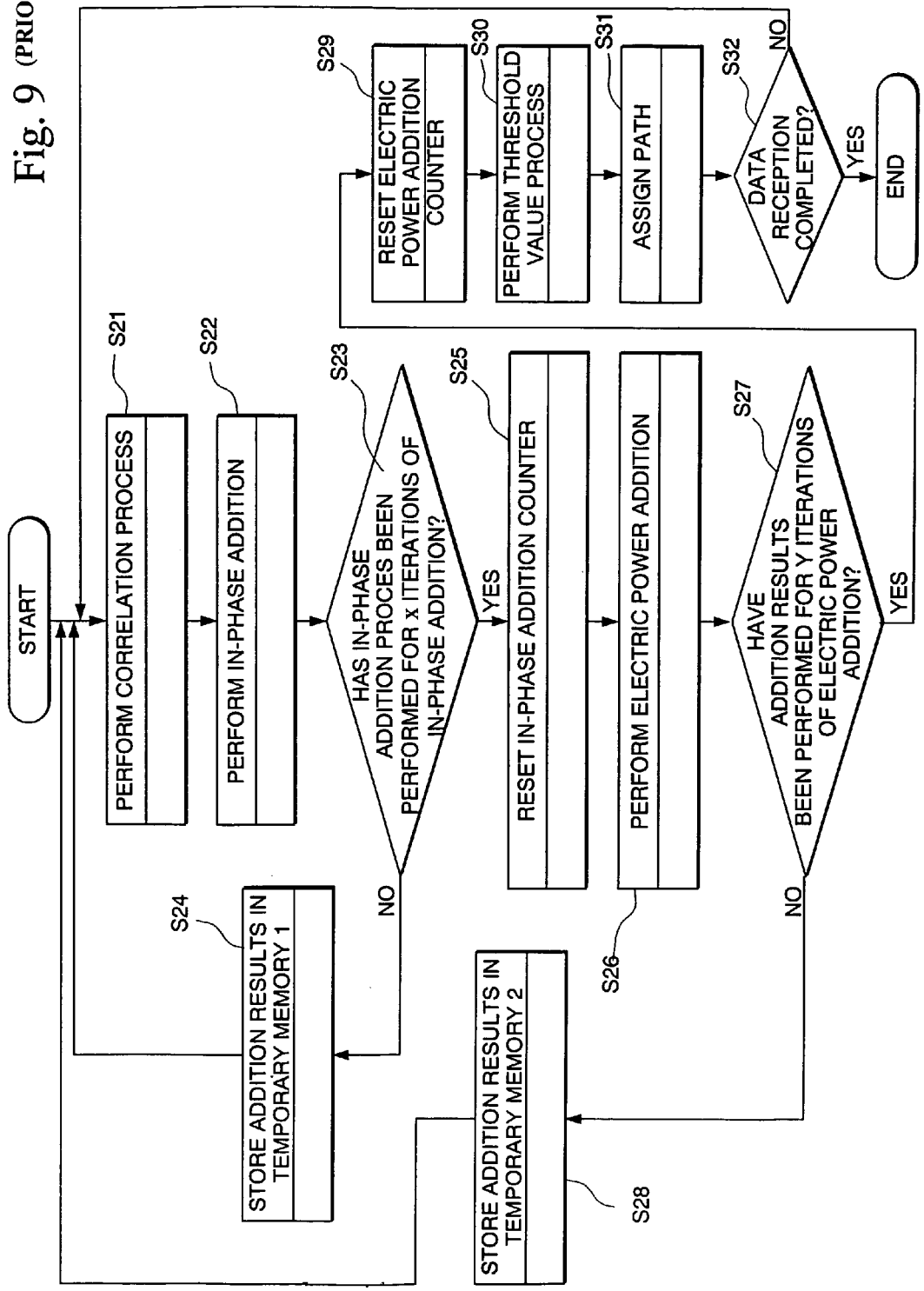
FIG. 9 is a flow chart describing the operation of the conventional example.

PATENT NO. : 7,042,931 B2
APPLICATION NO. : 09/858719
DATED : May 9, 2006
INVENTOR(S) : Tadashi Ogami It is certified that error appears in the above-identified patent and that said Letters Patent is hereby corrected as shown below:

Fig. 8, under "22" delete "MEMORY 1", insert --MEMORY 2--

Fig. 8, under "IN-PHASE ADDER" delete "20", insert --2--

Col. 7, line 63, delete "judgement", insert --judgment--

Signed and Sealed this

Twenty-fourth Day of June, 2008

JON W. DUDAS
*Director of the United States Patent and Trademark Office*